(12) United States Patent
Hara et al.

(10) Patent No.: US 12,731,847 B2
(45) Date of Patent: Sep. 8, 2026

(54) BATTERY PACK

(71) Applicant: SUBARU CORPORATION, Tokyo (JP)

(72) Inventors: Toshiyuki Hara, Tokyo (JP); Shinichi Kimura, Tokyo (JP)

(73) Assignee: Subaru Corporation, Tokyo (JP)

( * ) Notice: Subject to any disclaimer, the term of this patent is extended or adjusted under 35 U.S.C. 154(b) by 265 days.

(21) Appl. No.: 18/598,662

(22) Filed: Mar. 7, 2024

(65) Prior Publication Data

US 2024/0313325 A1 Sep. 19, 2024

(30) Foreign Application Priority Data

Mar. 15, 2023 (JP) ................................. 2023-040740

(51) Int. Cl.
*H01M 50/249* (2021.01)
*B60L 50/64* (2019.01)
*H01M 50/271* (2021.01)

(52) U.S. Cl.
CPC ........... *H01M 50/249* (2021.01); *B60L 50/64* (2019.02); *H01M 50/271* (2021.01); *H01M 2220/20* (2013.01)

(58) Field of Classification Search
CPC ............. H01M 50/249; H01M 50/271; H01M 50/358; H01M 50/367; H01M 2220/20
See application file for complete search history.

(56) References Cited

U.S. PATENT DOCUMENTS 10,343,548 B2 * 7/2019 Yokoyama .............. B60L 50/66
10,741,893 B2 * 8/2020 Kellner ............... H01M 10/613

FOREIGN PATENT DOCUMENTS

JP 2013-206728 A 10/2013

* cited by examiner

*Primary Examiner* — Huan Le
(74) *Attorney, Agent, or Firm* — McGinn IP Law Group, PLLC

(57) ABSTRACT

A battery pack includes a battery and a case. The case is configured to accommodate the battery. The case includes a bead and a continuous member. The bead protrudes outward with respect to a planar member. The continuous member is continuous with the bead and is configured to allow communication between an interior of the case and an area outside the case.

20 Claims, 6 Drawing Sheets

REAR
TOP
BOTTOM
FRONT
21b, 21
12
4
24
22
31
7
10
11
8
9
23
21a, 21

4
30
32
23a
32a
21a, 21
31
31
23
24
V
V
41
40
VI
41
22
31
31
21b, 21
VI
32
30
21c, 21

4
24
22a
41
25
22
41
21b, 21
23
21c, 21
25
21a, 21

BATTERY PACK

CROSS-REFERENCE TO RELATED APPLICATIONS

The present application claims priority from Japanese Patent Application No. 2023-040740 filed on Mar. 15, 2023, the entire contents of which are hereby incorporated by reference.

BACKGROUND

The disclosure relates to a battery pack in which a battery is accommodated.

In the related art, there has been proposed a battery pack that has an opening at the rear end of the upper surface of a battery housing case and that is provided with an exhaust port cover covering the opening (for example, Japanese Unexamined Patent Application Publication No. 2013-206728).

SUMMARY

An aspect of the disclosure provides a battery pack including a battery and a case. The case is configured to accommodate the battery. The case includes a bead and a continuous member. The bead protrudes outward with respect to a planar member. The continuous member is continuous with the bead and is configured to allow communication between an interior of the case and an area outside the case.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In the above-mentioned battery pack, since the battery housing case is provided with the exhaust port cover, there have been problems of an increased number of components and added structural complexity.

It is desirable to discharge, with a simple configuration, air in a battery pack.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

1. Overview of Configuration of Vehicle

Figure 1:
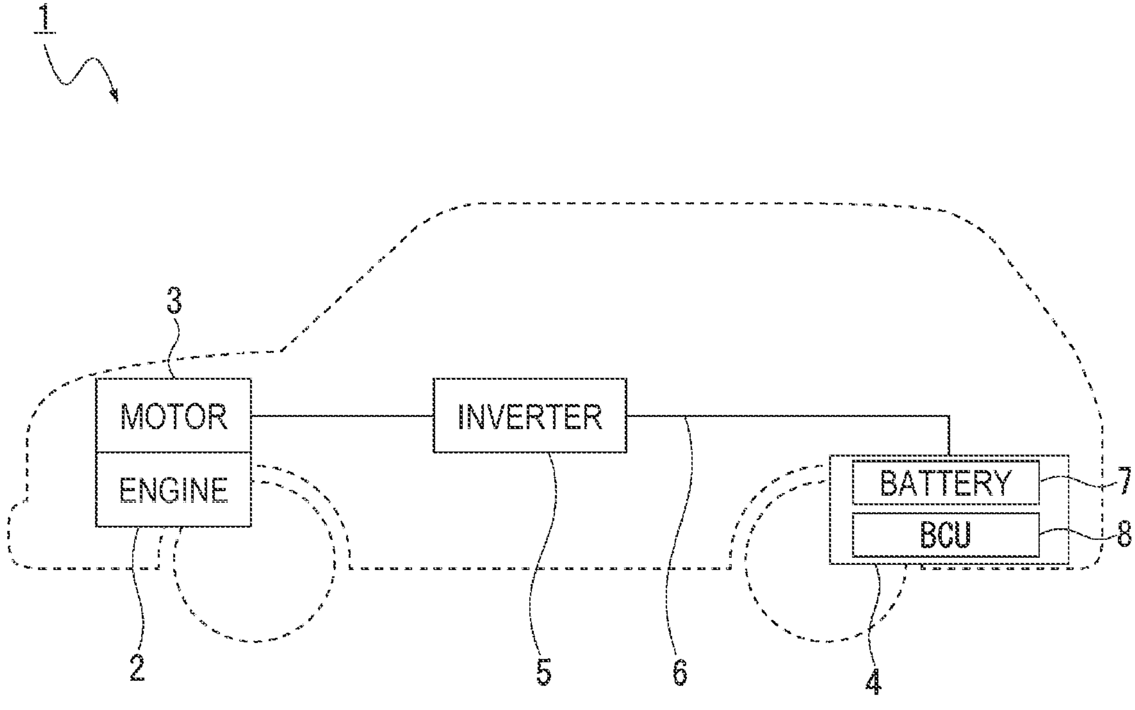
FIG. 1 is a diagram illustrating an overview of the configuration of a vehicle.

FIG. 1 is a diagram illustrating an overview of the configuration of a vehicle 1. In the following description, a traveling direction of the vehicle 1 will be defined as a forward direction. The direction in which the vehicle 1 moves rearward will be defined as a rearward direction. The direction toward the right-hand side in the traveling direction of the vehicle 1 will be defined as a rightward direction. The direction toward the left-hand side in the traveling direction of the vehicle 1 will be defined as a leftward direction. The direction toward the vertically upper side will be defined as an upward direction. The direction toward the vertically lower side will be defined as a downward direction.

As illustrated in FIG. 1, the vehicle 1 is a hybrid automobile that includes an engine 2, a motor 3, a battery pack 4, an inverter 5, and a power transmission cable 6. The battery pack 4 includes a battery 7, a battery control unit (BCU) 8, and so forth.

The engine 2 and the motor 3 are power sources that enable the vehicle 1 to travel. Note that the vehicle 1 may be an electric automobile that includes the motor 3 as its power source and that does not include the engine 2.

For example, the vehicle 1 travels as a result of the power from the engine 2 and the motor 3, which are the power sources, being transmitted to driving wheels.

The engine 2 is, for example, a horizontally-opposed engine in which a pair of cylinder groups are horizontally opposed to each other in the lateral direction with a crankshaft interposed therebetween. The engine 2 uses combustion pressure to cause a piston to reciprocate. The combustion pressure is obtained by igniting an air-fuel mixture of gasoline and air in the cylinders. The engine 2 obtains power by rotating the crankshaft that is coupled to the piston via a connecting rod. Note that the engine 2 may be an in-line engine, a V-engine, or the like. Alternatively, the engine 2 may be a diesel engine.

The motor 3 is, for example, a three-phase alternating-current motor. The motor 3 generates power by receiving electrical power that is supplied from the battery 7 via the power transmission cable 6 and the inverter 5.

In addition, the motor 3 generates electricity (electrical power) by performing a regenerative operation. The electricity generated by the regenerative operation of the motor 3 is supplied to the battery 7 via the inverter 5 and the power transmission cable 6.

The inverter 5 converts a direct current supplied from the battery 7 into a three-phase alternating current and supplies the three-phase alternating current to the motor 3. When the motor 3 performs the regenerative operation, the inverter 5 converts an alternating current supplied from the motor 3 into a direct current and supplies the direct current to the battery 7.

The battery 7 is a secondary battery and can store electricity that is to be supplied to the motor 3. The battery 7 is charged by the regenerative operation of the motor 3.

Alternatively, the battery 7 may be charged by being supplied with electricity from an external device (not illustrated).

The BCU 8 is constituted by, for example, an electronic control unit (ECU). The BCU 8 monitors the state of the battery 7 and controls the operation of the battery 7. Sensors that measure the current, voltage, and temperature of the battery 7 are coupled to the BCU 8, and the BCU 8 obtains measurement results from these sensors. In addition, the BCU 8 transmits the measurement results obtained from the sensors to another ECU and controls the operation of the battery 7 based on the measurement results obtained from the sensors or an instruction from the other ECU.

Figure 2:
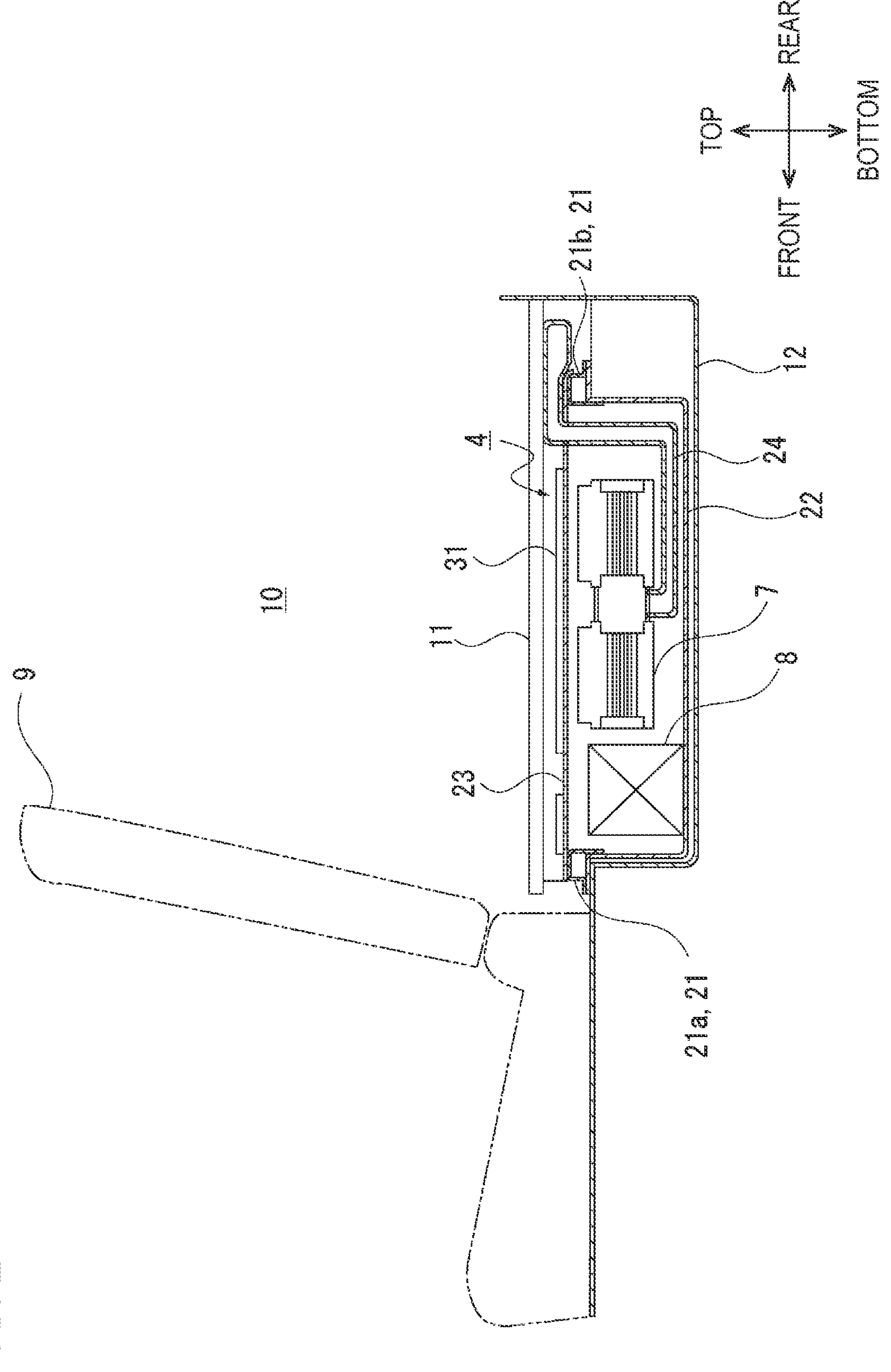
FIG. 2 is a diagram illustrating positioning of a battery pack.

FIG. 2 is a diagram illustrating positioning of the battery pack 4. Note that, in FIG. 2, a part of the configuration is illustrated in a cross-sectional view by hatching.

As illustrated in FIG. 2, the vehicle 1 includes a luggage compartment 10 that is positioned behind a rear passenger seat 9. The battery pack 4 is disposed below the luggage compartment 10. A luggage compartment board 11 is disposed above the battery pack 4, and luggage and the like can be disposed on the luggage compartment board 11. Note that a spacer (not illustrated) is interposed between the battery pack 4 and the luggage compartment board 11, and the luggage compartment board 11 is disposed on the battery pack 4 with the spacer interposed therebetween.

The battery pack 4 is disposed in a rear floor panel 12 and fixed to a vehicle body of the vehicle 1. The rear floor panel 12 is positioned below the luggage compartment board 11 and has a recessed shape with an upper opening.

Figure 3:
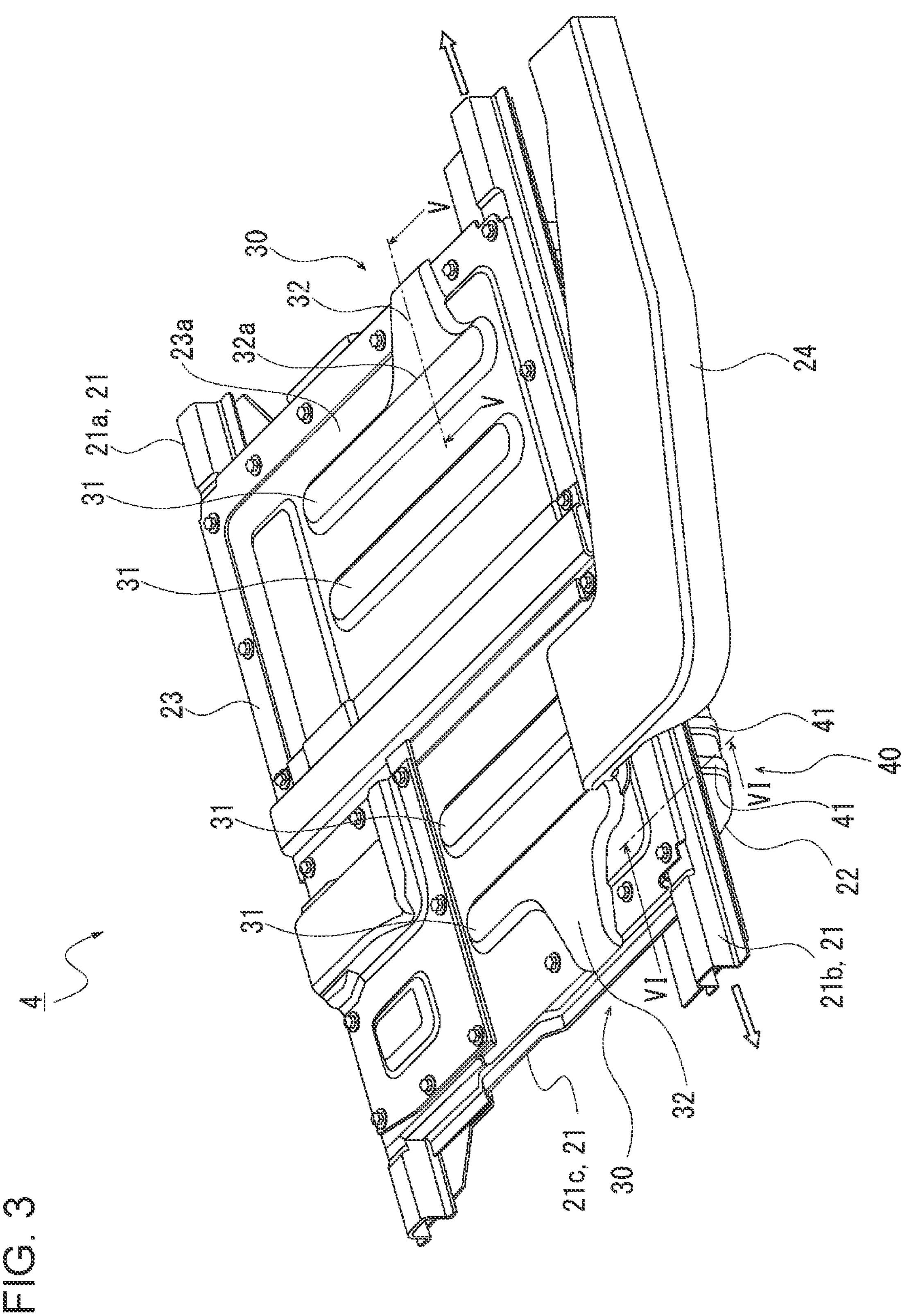
FIG. 3 is a perspective view of the battery pack when viewed from the upper rear side.
Figure 4:
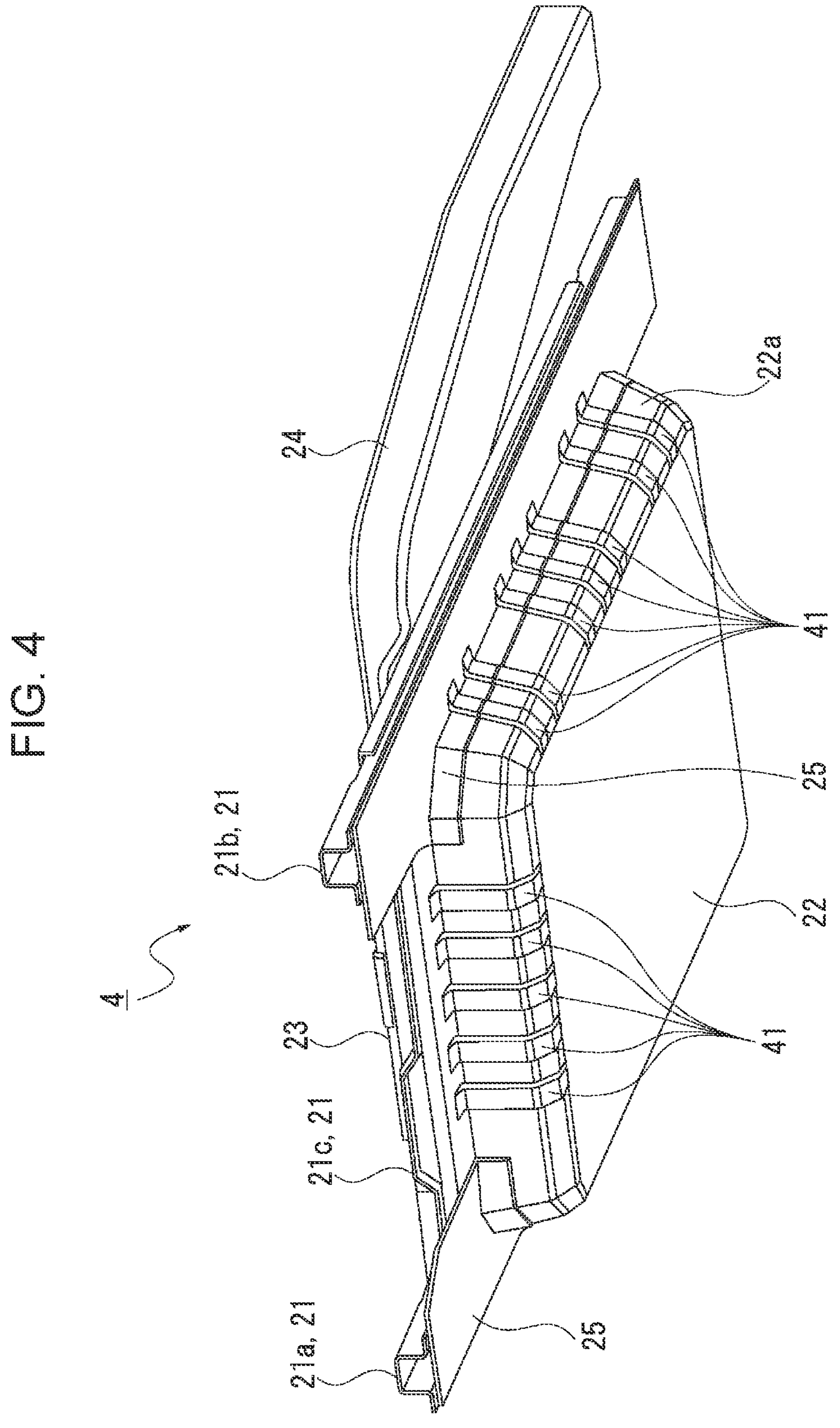
FIG. 4 is a perspective view of the battery pack when viewed from the lower rear side.

FIG. 3 is a perspective view of the battery pack 4 when viewed from the upper rear side. FIG. 4 is a perspective view of the battery pack 4 when viewed from the lower rear side.

As illustrated in FIG. 2 to FIG. 4, the battery pack 4 includes, in addition to the battery 7 and the BCU 8, which have been mentioned above, a frame 21, a battery case 22, a lid 23, and an intake duct 24.

The frame 21 includes a front frame 21*a*, a rear frame 21*b*, a left frame 21*c*, and a right frame 21*d*. The front frame 21*a* and the rear frame 21*b* each extend in the lateral direction. The left frame 21*c* and the right frame 21*d* each extend in the longitudinal direction of the vehicle 1.

The front frame 21*a* and the rear frame 21*b* are disposed so to be spaced apart from each other by a predetermined distance in the longitudinal direction. The left frame 21*c* and the right frame 21*d* are disposed so to be spaced apart from each other by a predetermined distance in the lateral direction. The front frame 21*a*, the rear frame 21*b*, the left frame 21*c*, and the right frame 21*d* are coupled to one another, so that the frame 21 have the shape of a picture frame with a center opening when seen as a whole.

The front frame 21*a*, the rear frame 21*b*, the left frame 21*c*, and the right frame 21*d* are made of, for example, a metal material such as aluminum. Each of these frames has a protruding shape when viewed in cross section and is open in the downward direction so as to improve the rigidity thereof. The battery pack 4 is fixed in place by fastening the frame 21 to the vehicle body with, for example, fastening bolts (not illustrated).

The battery case 22 is attached to the lower side of the frame 21 by using, for example, fastening bolts. The battery case 22 has a recessed shape with an upper opening. The battery 7, the BCU 8, and so forth are accommodated in the battery case 22. In the battery case 22, the battery 7 is positioned behind the BCU 8. Reinforcement members 25 for reinforcing the battery case 22 are joined to the front side and the rear side of the battery case 22 by spot welding.

The lid 23 is disposed on the frame 21. The lid 23 is, for example, a flat plate made of a metal material such as aluminum and covers the upper opening of the battery case 22. The lid 23 has beads 31, and these beads 31 improve the rigidity of the lid 23.

As described above, in the battery pack 4, the battery 7 and the BCU 8 are accommodated in a space that is surrounded by the frame 21, the battery case 22, and the lid 23. Thus, the frame 21, the battery case 22, and the lid 23 serve as a case that houses the battery 7 and the BCU 8.

The intake duct 24 is an example of a duct through which the air in a cabin flows into the battery pack 4 (the case) for cooling cells. The intake duct 24 is disposed in such a manner as to extend through the lid 23. One end of the intake duct 24 is coupled to the lower side of the battery 7, and the other end of the intake duct 24 is open toward the inside of the cabin.

In the battery pack 4, a fan (not illustrated) causes the air to flow into the battery case 22 through the intake duct 24. The air that flows in through the intake duct 24 cools the battery 7. Then, the air warmed as a result of cooling the battery 7 is discharged to the outside of the battery case 22 mainly through flow structures 30 and 40 (see FIG. 5 and FIG. 6).

The battery pack 4 includes the flow structures 30 and 40 in order to discharge the air warmed as a result of cooling the battery 7 to the outside. The flow structures 30 and 40 will be described below.

2. Overview of Configuration of Flow Structures 30

Figure 5:
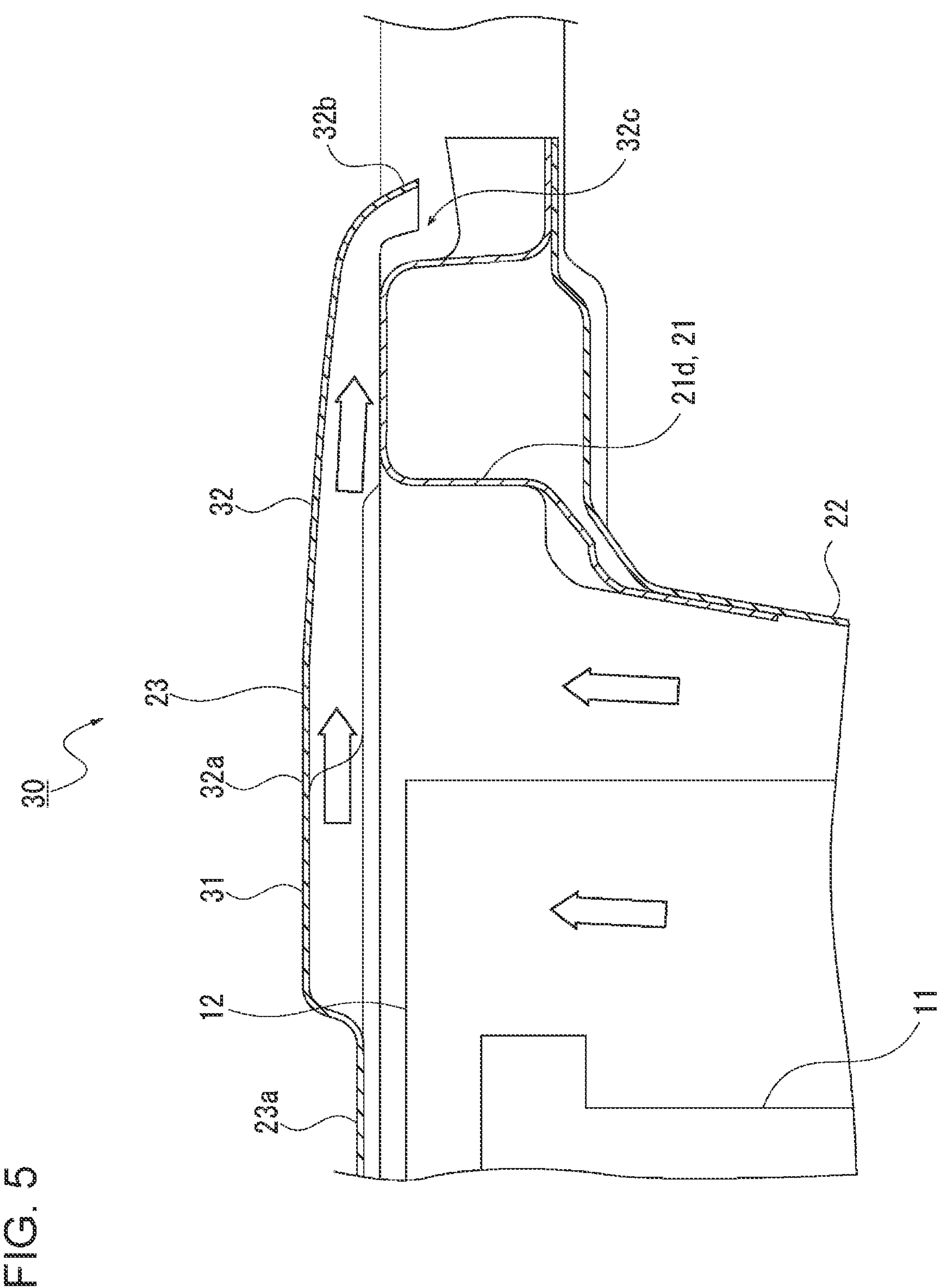
FIG. 5 is a cross-sectional view taken along line V-V of FIG. 3.

FIG. 5 is a cross-sectional view taken along line V-V of FIG. 3. As illustrated in FIG. 3 and FIG. 5, the flow structures 30 include the beads 31 and continuous members 32.

The lid 23 has the beads 31 each of which protrudes in the upward direction from a flat surface 23*a* that extends in the horizontal direction. For example, the number of the beads 31 is four, and the four beads 31 are disposed so as to be isolated from one another in the lateral direction. Each of the beads 31 extends along the longitudinal direction.

The continuous members 32 are respectively continuous with the rightmost bead 31 and the leftmost bead 31, which are the two outermost beads 31 among the four beads 31 in the lateral direction. Thus, the two flow structures 30 are provided, one at the right end and the other at the left end of the lid 23.

Note that, although the flow structure 30 provided on the right side will be described below, the flow structure 30 provided on the left side has a similar configuration.

The continuous member 32 is coupled to the corresponding bead 31 in such a manner as to be positioned behind the center of the bead 31 in the longitudinal direction. When seen as a whole, the continuous member 32 protrudes in the upward direction (toward the outside of the case) from the flat surface 23*a* like each of the beads 31.

A coupling end 32*a* of the continuous member 32 that is coupled to the bead 31 has approximately the same height as that of the bead 31. In addition, the width of the continuous member 32 in the longitudinal direction decreases with increasing distance from the bead 31, and the continuous member 32 is inclined in the downward direction.

The continuous member 32 extends such that an end 32*b* thereof on the side opposite to the bead 31 is positioned on the right-hand side of the outer edge of the right frame 21*d* (outside the outer edge of the right frame 21*d*). In addition, the end 32*b* is positioned below the upper surface of the battery case 22 and the upper surface of the right frame 21*d*. Consequently, an opening 32*c* that is open in the downward direction is formed between the end 32*b* of the continuous member 32 and the right frame 21*d*.

Next, the flow of the air in the flow structure 30 will be described. In FIG. 5, the flow of the air is indicated by outlined arrows.

The air that has been drawn in through the intake duct 24 and warmed as a result of cooling the battery 7 flows from the lower side toward the upper side in the battery case 22 and flows into the flow structure 30.

The air flows into the flow structure 30 from the side on which the bead 31 or the coupling end 32*a* of the continuous member 32 is located. The air that has flowed in the flow structure 30 flows along the continuous member 32 toward the end 32*b* (toward the opening 32*c*). In this case, the width of the continuous member 32 decreases with increasing distance from the bead 31, and the continuous member 32 is inclined in the downward direction. Thus, the cross-sectional area of the continuous member 32 becomes smaller toward the coupling end 32*a*.

Accordingly, the flow velocity of the air flowing along the continuous member 32 increases toward the end 32*b*. Thus, in the flow structure 30, the warmed air can be efficiently discharged.

In addition, since the opening 32*c* faces downward, the probability of foreign matter entering the battery case 22 can be reduced, and the probability of direct contact with the battery 7 from the outside can be reduced.

Furthermore, since the opening 32*c* is positioned in the vicinity of the upper end of the battery case 22, even if, for example, the vehicle 1 is submerged in water, the water is less likely to enter the battery case 22. Therefore, the flow structure 30 can reduce the probability that the battery 7 will be submerged in water and that leakage of current will occur.

3. Overview of Configuration of Flow Structure 40

Figure 6:
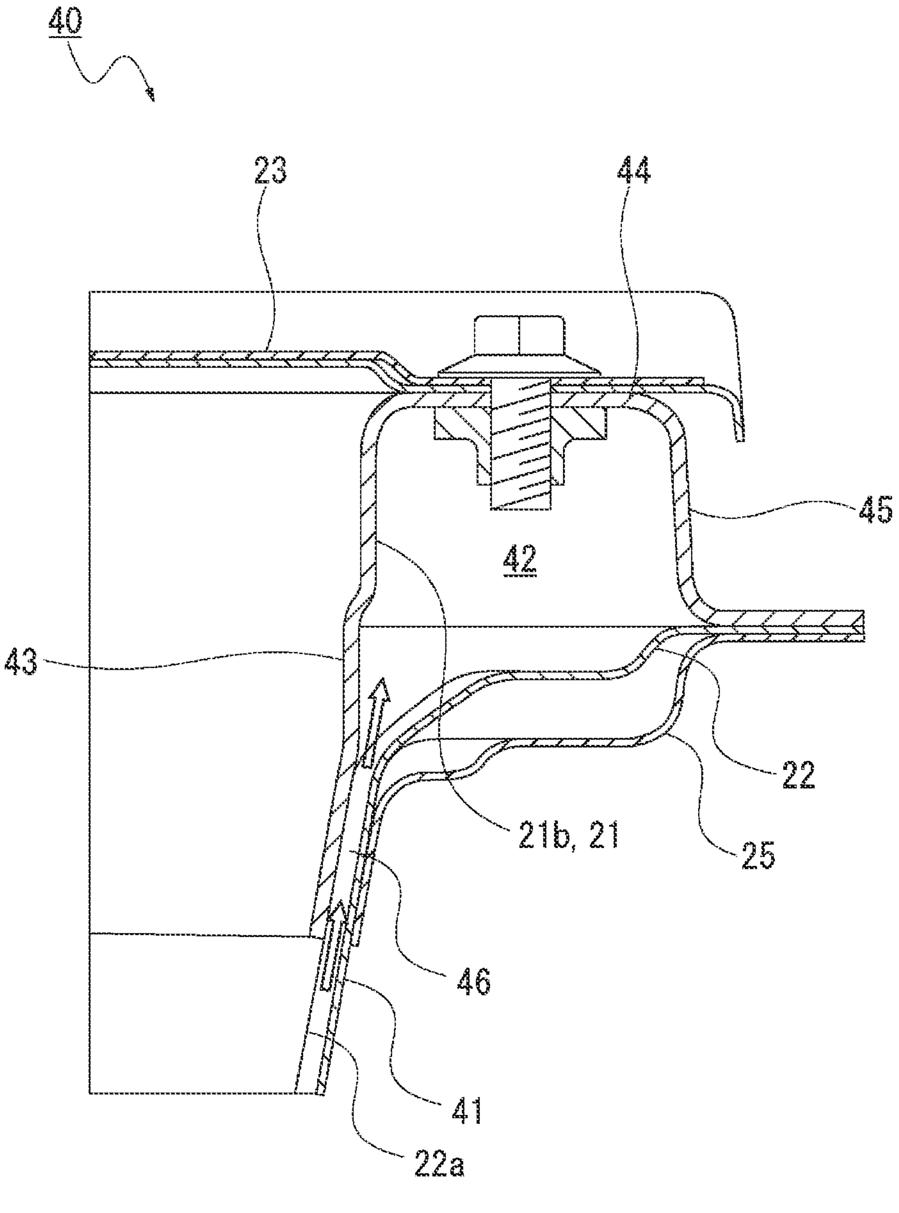
FIG. 6 is a cross-sectional view taken along line VI-VI of FIG. 3.

FIG. 6 is a cross-sectional view taken along line VI-VI of FIG. 3. As illustrated in FIG. 6, the flow structure 40 includes beads 41 and the rear frame 21*b*.

As illustrated in FIG. 3, FIG. 4, and FIG. 6, the front, rear, left, and right side surfaces of the battery case 22 each have the multiple beads 41 that protrude outward, and these beads 41 improve the rigidity of the battery case 22. For example, a rear surface 22*a*, which is the rear side surface of the battery case 22, has the beads 41 each of which protrudes rearward. Each of the beads 41 extends along the vertical direction.

The rear frame 21*b* has a front surface 43, an upper surface 44, and a rear surface 45. The front surface 43 extends along the vertical direction on the front side. The upper surface 44 is coupled to the upper end of the front surface 43 and extends along the longitudinal direction. The rear surface 45 is coupled to the rear end of the upper surface 44 and extends along the vertical direction and then extends rearward.

In the rear frame 21*b*, a space that is surrounded by the front surface 43, the upper surface 44, and the rear surface 45 serves as an exhaust space 42.

A lower portion of the front surface 43 of the rear frame 21*b* and the rear surface 22*a* of the battery case 22 are joined to each other by, for example, spot welding. Thus, the beads 41 each of which protrudes rearward from the rear surface 22*a* of the battery case 22 are not in contact with the front surface 43 of the rear frame 21*b*.

A gap 46 is formed between the beads 41, each of which protrudes rearward from the rear surface 22*a* of the battery case 22, and the lower portion of the front surface 43 of the rear frame 21*b*. The gap 46 communicates with the internal space of the battery case 22 and also communicates with the exhaust space 42.

The rear frame 21*b* serves as a continuous member that is continuous with the beads 41 and that allows communication between the inside and the outside of the battery case 22.

The flow of the air in the flow structure 40 will now be described. In FIG. 3 and FIG. 6, the flow of the air is indicated by outlined arrows.

The air that has been drawn in through the intake duct 24 and warmed as a result of cooling the battery 7 flows from the lower side toward the upper side in the battery case 22 and flows into the flow structure 40.

The air flows into the flow structure 40 from the gap 46 between the beads 41 and the front surface 43 of the rear frame 21*b*. The air that has flowed in the flow structure 40 flows in the upward direction along the gap 46 and reaches the exhaust space 42. The air that has reached the exhaust space 42 flows in the rightward direction or the leftward direction along the rear frame 21*b* (the exhaust space 42) and is discharged from the right end or the left end of the rear frame 21*b*.

In the flow structure 40, since the exhaust space 42 is defined in the vicinity of the upper end of the battery case 22, even if, for example, the vehicle 1 is submerged in water, the water is less likely to enter the battery case 22. Therefore, the flow structure 40 can reduce the probability that the battery 7 will be submerged in water and that leakage of current will occur.

In addition, the gap 46 extends along the vertical direction, and the exhaust space 42 extends along the lateral direction. Thus, the probability of foreign matter entering the battery case 22 can be reduced, and the probability of direct contact with the battery 7 from the outside can be reduced.

4. Modifications

Note that the above-described embodiment is an example for implementing the disclosure, and the disclosure is not limited to the above-described embodiment, and various modifications are possible.

For example, in the above-described embodiment, the battery pack 4 includes the flow structures 30 and the flow structure 40. However, the battery pack 4 may include the flow structures 30 or the flow structure 40.

In the above-described embodiment, the flow structures 30 are provided, one at the left end and the other at the right end of the lid 23. However, the single flow structure 30 may be provided at the left end of the lid 23 or the right end of the lid 23. Alternatively, the multiple flow structures 30 may be provided at both the left and right ends of the lid 23.

However, the battery pack 4 is disposed in the vicinity of the rear passenger seat 9, and the warmed air is discharged through the flow structures 30. Thus, the flow structures 30 may each be positioned away from the rear passenger seat 9 in order to avoid discomfort for an occupant in the rear passenger seat 9. Therefore, the flow structures 30 may be positioned behind the center in the longitudinal direction, that is, at the rear side of the vehicle 1.

In the above-described embodiment, the flow structure 40 includes the rear frame 21*b*, which is one of the four frames constituting the frame 21. The flow structure 40 may be include the front frame 21*a*, the rear frame 21*b*, and the left frame 21*c*.

However, since the battery pack 4 is disposed in the vicinity of the rear passenger seat 9, and the warmed air is discharged through the flow structure 40. Thus, the flow structure 40 may be positioned away from the rear passenger seat 9 in order to avoid discomfort for the occupant in the rear passenger seat 9. Therefore, the flow structure 40 may include the rear frame 21*b*.

5. Supplementary Note

As described above, the battery pack 4 of the embodiment includes the battery 7 and the case (the frame 21, the battery case 22, and the lid 23) that accommodates the battery 7. The case includes the beads 31 and 41 each of which protrudes outward with respect to a corresponding one of the planar members (the flat surface 23*a* and the rear surface 22*a*), and the continuous members (the continuous members 32 and the rear frame 21*b*) each of which is continuous with a corresponding one of the beads 31 and 41 and each of which allows communication between the inside and the outside of the case.

Thus, the battery pack 4 uses the beads 31 and 41 for improving the rigidity of the case so as to discharge the air inside the case through the continuous members 32, each of which is continuous with the corresponding bead 31, and through the rear frame 21*b*, which is continuous with the beads 41.

Consequently, the number of components of the battery pack 4 can be reduced, and the configuration of the battery pack 4 can be simplified without adding extra components for discharging the air inside the case.

The case includes the battery case 22 having the upper opening and the lid 23 covering the upper opening of the battery case 22. The lid 23 has the beads 31 and the continuous members 32. Each of the continuous members 32 extends such that its end on the side opposite to the beads 31 is positioned outside the outer edge of the battery case 22 and such that the end faces downward.

As a result, in the battery pack 4, each of the openings 32*c* faces downward. Thus, the probability of foreign matter entering the battery case 22 can be reduced, and the probability of direct contact with the battery 7 from the outside can be reduced.

In addition, since each of the openings 32*c* is positioned in the vicinity of the upper end of the battery case 22, even if, for example, the vehicle 1 is submerged in water, the water is less likely to enter the battery case 22. Therefore, the flow structures 30 can reduce the probability that the battery 7 will be submerged in water and that leakage of current will occur.

Each of the beads 31 extends along the longitudinal direction of the vehicle 1, and each of the continuous members 32 is coupled to one of the beads 31 so as to be positioned behind the center of the bead 31 in the longitudinal direction.

Consequently, the air can be discharged at a position far from the rear passenger seat 9. Thus, the probability of the warmed air hitting an occupant in the rear passenger seat 9 and causing discomfort can be reduced.

The width of each of the continuous members 32 decreases with increasing distance from the corresponding bead 31, and each of the continuous members 32 is inclined in the downward direction.

Accordingly, the flow velocity of the air flowing along each of the continuous members 32 increases toward the corresponding coupling end 32*a*. Thus, the battery pack 4 can efficiently discharge the warmed air.

The case includes the battery case 22 having the upper opening, the lid 23 covering the upper opening of the battery case 22, and the frame (the rear frame 21*b*) that is disposed between the battery case 22 and the lid 23 and that fixes the case to the vehicle body. The battery case 22 has the beads 41. The frame (the rear frame 21*b*) serves as the continuous member.

Thus, the battery pack 4 uses the beads 41 for improving the rigidity of the case so as to discharge the air inside the case through the exhaust space 42 of the rear frame 21*b*, which is continuous with the beads 41.

Consequently, the number of components of the battery pack 4 can be reduced, and the configuration of the battery pack 4 can be simplified without adding extra components for discharging the air inside the case.

The battery pack can discharge the air inside the case through the bead and the continuous portion.

According to the disclosure, the air in the battery pack can be discharged with a simple configuration.

The invention claimed is:

1. A battery pack comprising:
a battery; and
a case configured to accommodate the battery,
wherein the case comprises:
a bead protruding outward with respect to a planar member;
a continuous member that is continuous with the bead and that is configured to allow communication between an interior of the case and an area outside the case;
a battery case having an upper opening; and
a lid configured to cover the upper opening of the battery case, and
wherein the lid comprises the bead and the continuous member.

2. The battery pack according to claim 1,
wherein the continuous member extends such that an end of the continuous member on a side opposite to the bead is positioned outside an outer edge of the battery case and such that the end faces downward.

3. The battery pack according to claim 2, wherein the bead extends along a longitudinal direction of a vehicle, and
wherein the continuous member is coupled to the bead so as to be positioned behind a center of the bead in the longitudinal direction.

4. The battery pack according to claim 2, wherein the continuous member is inclined downward, and has a width that decreases as a distance from the bead increases.

5. The battery pack according to claim 1, wherein the bead and the continuous member together form a flow structure configured to discharge air from the interior of the case to the area outside the case.

6. The battery pack according to claim 5, wherein the flow structure is configured to discharge air that has been warmed as a result of cooling the battery.

7. The battery pack according to claim 5, wherein a cross-sectional area of the continuous member decreases in a direction from the bead toward an end of the continuous member on a side opposite to the bead, such that a flow velocity of air flowing along the continuous member increases toward the end.

8. The battery pack according to claim 5, wherein the battery pack is configured to be disposed in a vehicle below a luggage compartment, and wherein the flow structure is positioned to discharge air at a position away from a rear passenger seat of the vehicle.

9. The battery pack according to claim 1, wherein the bead is configured to improve rigidity of the case.

10. The battery pack according to claim 9, wherein the planar member is a flat surface of the lid of the case, and the bead protrudes upward from the flat surface.

11. The battery pack according to claim 1, wherein the continuous member comprises an opening that faces downward, and the opening is configured to reduce a probability of foreign matter entering the case.

12. The battery pack according to claim 1, wherein the continuous member comprises an opening positioned in a vicinity of an upper end of the case such that water is less likely to enter the case when a vehicle in which the battery pack is disposed is submerged.

13. The battery pack according to claim 1, wherein the case further comprises an intake duct configured to allow air to flow into the case for cooling the battery.

14. The battery pack according to claim 1, wherein the bead extends along a first direction, and the continuous member extends in a second direction that intersects the first direction.

15. The battery pack according to claim 1, wherein a coupling end of the continuous member that is coupled to the bead has approximately a same height as the bead.

16. The battery pack according to claim 1, wherein the case comprises a plurality of beads disposed so as to be isolated from one another, and the continuous member is continuous with at least one of the plurality of beads.

17. The battery pack according to claim 1, wherein the continuous member defines an exhaust space, and wherein a gap is formed between the bead and the continuous member such that the gap communicates with both an internal space of the case and the exhaust space.

18. The battery pack according to claim 1, wherein the case is made of a metal material.

19. A battery pack comprising:

a battery; and a case configured to accommodate the battery, wherein the case comprises:

- a bead protruding outward with respect to a planar member; and
- a continuous member that is continuous with the bead and that is configured to allow communication between an interior of the case and an area outside the case, wherein the case comprises:

- a battery case having an upper opening;
- a lid configured to cover the upper opening of the battery case; and
- a frame that is disposed between the battery case and the lid and that is configured to fix the case to a vehicle body, wherein the battery case comprises the bead, and wherein the frame serves as the continuous member.

20. The battery pack according to claim 19, wherein the planar member is a side surface of the battery case, and the bead protrudes outward from the side surface.

* * * * *